Patented Mar. 12, 1929.

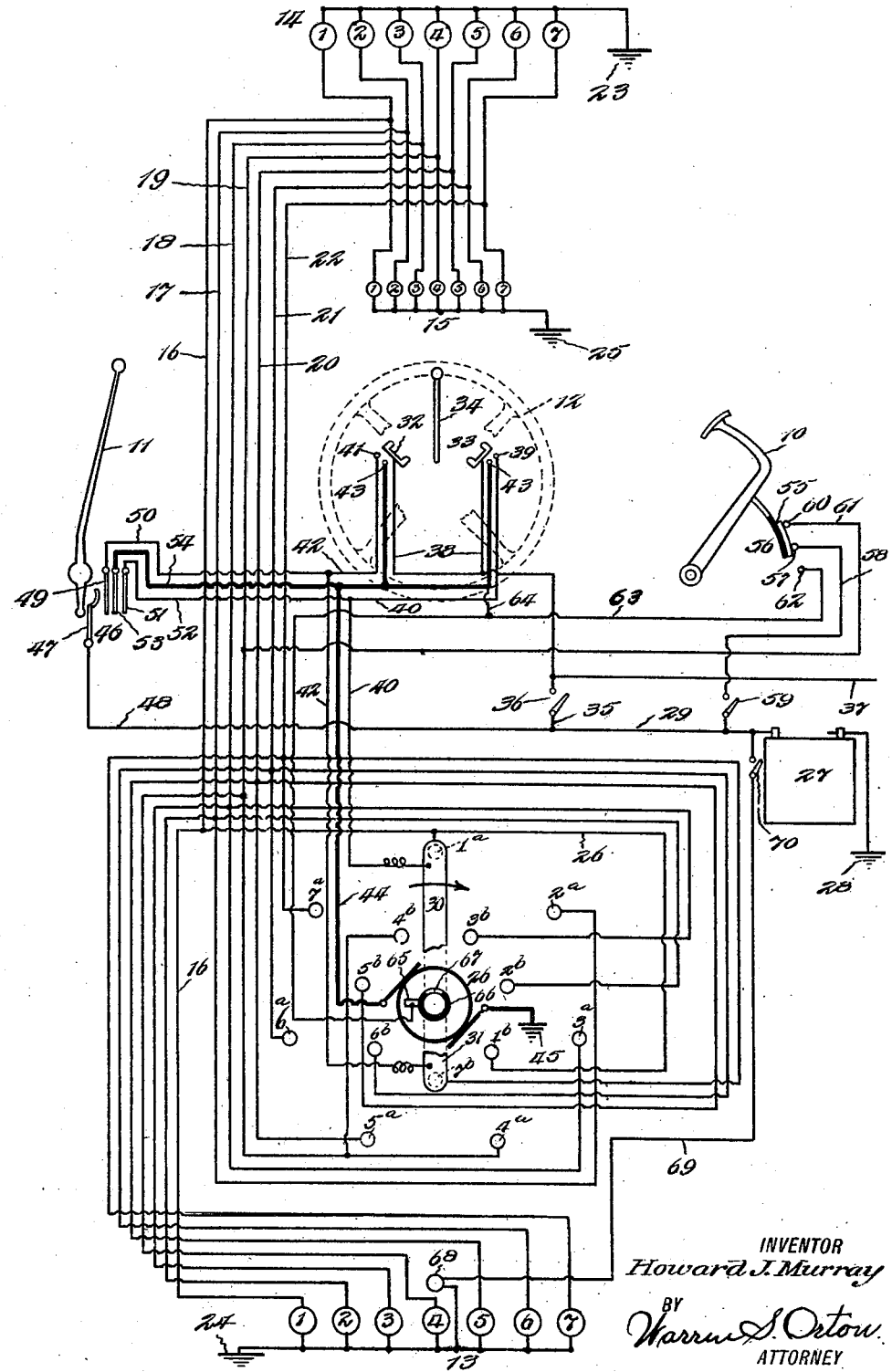

1,704,709

UNITED STATES PATENT OFFICE.

HOWARD J. MURRAY, OF NEW YORK, N. Y., ASSIGNOR TO R. M. COMPANY, INC., OF EAST PITTSBURGH, PENNSYLVANIA, A CORPORATION OF DELAWARE.

MOVABLE SIGNAL DEVICE.

Application filed January 7, 1925. Serial No. 949.

The invention relates to a signalling device designed for use in any situation where warning signals are to be conveyed visually and specifically the invention is designed to be used on automotive vehicles for the purpose of indicating or preindicating a movement of the vehicle to the right or left or to indicate some other movement of the vehicle or to indicate the intent of the operator to effect such a movement.

The primary object of the invention is to provide a direction indicating signal for use on a vehicle which signal can be actuated selectively to indicate the direction desired, which will be positive in its actuation; which will clearly and unquestionably designate the direction being indicated and which will be notice compelling in its operation and forcibly attract the attention of the operator of the following vehicle, even under conditions which are not favorable to the visibility of light signals.

Broadly this phase of the invention is attained by causing a light, or a series of lights, to move, or to appear to move, in the direction indicated and otherwise to take advantage of the physiological effect on the person being warned of an object or light moving in the range or vision of such person for the purpose of simultaneously attracting his attention and giving him the proper information.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

In the accompanying drawing:

The figure is a view largely diagrammatic, illustrating a preferred embodiment of the invention together with associated electric connections organized to form the several electric controls necessary to meet the several functions required when the invention is embodied in a form for use as a signal system of an automotive vehicle.

In the drawings it will be understood that the showing therein disclosed is illustrated in connection with an automotive vehicle, certain control elements of which are shown diagrammatically. There is disclosed for instance, a service brake 10, a control lever 11 for effecting the change speed combination in the transmission and there is disclosed a steering wheel 12 all of conventional design and function.

There is also disclosed in their proper position on the vehicle a rear signal lamp 13, a similar front signal lamp 14 and a pilot signal lamp 15 preferably positioned on the dash or in some other position visible to the operator manipulating the steering wheel 12.

The lamps are similar in that they each contain a plurality of lights herein shown to be seven in number, lettered consecutively from one to seven from left to right in the diagrammatic drawing. The lights are disposed in a straight line to form a set which extends transversely of the vehicle and is so disposed that the lights forming the front signal lamp 14 are visible to the traffic officer or to the driver of another vehicle in advance of the vehicle herein disclosed; the lights forming the rear signal lamp 13 are similarly visible to a person in rear of the vehicle and the lights forming the pilot lamp 15 are disposed so as to be facing the operator of the vehicle equipped with the signal device. The similarly positioned lights of each lamp are electrically connected to form a plurality of light circuits, one for each similarly numbered light. For instance, the lights numbered 1 are connected by means of conductor 16 and the succeedingly numbered lights are similarly connected respectively by conductors 17, 18, 19, 20, 21 and 22. The lamp 14 is grounded at 23; the lamp 13 at 24; and the lamp 15 at 25; in each case the groundings preferably being on the frame of the vehicle.

Each of the light connecting conductors are connected to two fixed contacts, for instance, conductor 16, connecting the lights numbered 1 is connected by means of conductor 26 with the fixed contacts $1^a$ and $1^b$. Similarly the other numbered light connecting conductors 17, 18, 19, 20, 21 and 22 are connected to a pair of fixed contacts having the same numerical designation as its corresponding light and one lettered "a" and the other "b". One contact from each light circuit forms a set of fixed contacts disposed in a circle and designated with "a" as an index. The other contacts from each light circuit are similarly arranged in a circle to form a set lettered "b" and concentrically disposed within the circle of the "a" set of contacts. The "a" set of contacts are arranged in succession clockwise with a contact controlling the first or left end light at the top of the showing in the figure. The contacts in the "b" set are arranged in successive numerical order and disposed clockwise with the last contact 7$^b$ in the 6 o'clock position at the bottom of the circle shown in the figure.

A combined electric motor and flasher 26 is employed to control the order in which the lights are lit. This motor is supplied from a source of electric energy 27, preferably the ignition battery commonly found on automotive vehicles. The motor is contained in a motor circuit partially indicated by heavy lines in the figure, and is grounded at 28. The other side of the battery supplies a main feed line 29, and connects the battery through one of a plurality of control switches hereinafter described.

The motor is provided with two wiping contacts, of unequal length, which contacts are moved by the rotation of the motor in a clockwise direction as indicated by the arrow in the figure. The longer contact 30, is designed in its revolving movement to wipe across and thus complete an electric engagement with the contacts 1$^a$, 2$^a$, 3$^a$, 4$^a$, 5$^a$, 6$^a$ and 7$^a$. Similarly, the other and shorter wiping contact 31 which extends diametrically from the axis of rotation of the motor from the contact 30, is similarly designed to electrically engage the contacts 7$^b$, 6$^b$, 5$^b$, 4$^b$, 3$^b$, 2$^b$ and 1$^b$ in order. It will be appreciated from this showing that the rotation of the motor in one direction, that is, in the clockwise direction illustrated, will cause the contacts which control the different light circuits to be closed in electrically reversed order. Differently expressed it will be seen that the rotation of the contact wiper 30, in its clockwise movement, will successively close the circuits through the progressively numbered lights from 1 to 7 and this cycle of movements is repeated with each complete revolution of the motor controlled wiper contact 30. Similarly, the clockwise movement of the contact wiper 31 will close the lights in the reversely numbered position, that is, beginning with the right hand light 7, the lights will flash successively from right to left of the showing in the figure and in reverse numbered position from 7 to 1 and this cycle of operation will be repeated with each repetition of a complete rotation of the wiper contact 31.

Under certain conditions, such, for instance, when it is desired to have the lights flash from left to right of the showing in the figure, in order to indicate a movement of the vehicle or an intention of the operator to cause the vehicle to move to the right, current will be supplied to the wiper contact 30. Similarly, if it is desired to indicate the direction of movement, or intended movement to the left, current will be supplied to the wiper contact 31 and under other conditions where it is desired that the lights be lit simultaneously at opposite ends of the line of lights and then progressively flash towards the opposite end to cause in effect waves of light passing each other, then current will be simultaneously supplied to both of the wiper contacts 30 and 31. It is within the scope of the disclosure to control the actuation of the motor and the selection of the current supply at will to either the wiping contacts 30 or 31 by means of manually actuated control switches 32 and 33 positioned convenient to the operator and preferably positioned on the steering wheel 12. It is further suggested that these switches be controlled automatically as an incident to the steering of the vehicle and for this purpose there is herein disclosed an actuating finger 34 carried by the steering wheel 12 and designed in its steering movement to the right or left to correspondingly shift the switches 32 and 33 into operative position.

The switches are supplied with current from the battery 27 which connects by means of a main lead 35 across an ignition switch 36 to the ignition lead 37. From the ignition lead a bifurcated conductor 38 leads to the movable elements of both of the switches 32 and 33 and thus supplies current to the steering wheel switches. These switches are of the two point contact type, with one point 39 of the right hand switch 33, leading by means of conductor 40 to the wiper 30 and the corresponding contact 41 of the left switch leading by means of conductor 42 to the wiper contact 31. The other point 43 of each of the switches 32 and 33 forms the bifurcated ends of a motor supply conductor 44 shown in heavy lines in the figure and leading to one side of the motor 26. The other side of the motor is grounded at 45 and in general it is to be understood that the motor is of conventional design. From this construction it will be understood that the actuation of one of the switches, such for instance, as the switch 33, either by direct manual manipulation or by the turning of the steering wheel to the right will simultaneously close the circuit to the motor, thus causing the same to rotate the wiper 30, and at the same time current is supplied through conductor 40 to the wiper contact 30. As the wiper engages the successively numbered contacts 1$^a$, 2$^a$, 3$^a$, 4$^a$, 5$^a$, 6$^a$ and 7$^a$, current is supplied in successive order to the lights numbered 1, 2, 3, 4, 5, 6 and 7, thus causing in effect a spot of light to move from the left to the right across the line of lights in all of the lamps and thus indicate a turning movement of the vehicle to the right. Similarly the closing of the switch 32 will cause a reverse movement of the spot of light from right to left to indicate a left turning movement of the vehicle.

Disposed in the transmission casing and in position to be actuated by the shift lever 11 when making a gear change combination to cause the vehicle to move backwards is a three-point circuit closer 46. Current is supplied to the movable element 47 of the switch through a conductor 48 leading from the motor supply lead 29, so that the circuit closer 46 may be supplied independent of the ignition. The movable element 47 is designed to be moved by the lever 11 into position to supply current to the motor and to both of the wiping contacts 30 and 31. For this purpose one of the points 49 is connected by means of conductor 50 with conductor 42 for supplying wiper 31, the second point 51 is connected by means of conductor 52 with conductor 40 for supplying current to the wiper contact 30. The third and intermediate point 53 is connected by conductor 54 with conductor 44 for supplying the motor. From this construction it will be seen that the movement of the shift lever to effect a reverse movement of the vehicle will automatically and simultaneously close the circuit through the motor, thus causing it to rotate, and at the same time will supply current to both the wiping contacts 30 and 31. This will cause a waving of light back and forth across the line of lights in each of the lamps thus indicating a backing movement of the vehicle.

In the device illustrated it is proposed to use one of these signal lights, in this instance, the middle light No. 4, as a constantly ignited reference light, such as the tail light, but which will automatically be extinguished when the line of lights function as a signal light, in which case the No. 4 light functions in its position as one of the signal lights. As it is a usual practice to apply the brake when making a turn to the right or left, or when about to back, it is herein suggested that the normally lit tail light be extinguished automatically by the movement of the brake into its operatively braking position. For this purpose the brake 10 is shown to control the movable element 55 of a three-point circuit closer 56 of which the middle point 57 is constantly connected by means of a conductor 58 with the main lead 29 through a manually actuated signal switch 59 mounted on the switch-board. In its normal inoperative position the contact 55 closes the circuit between point 57 and a point 60 which connects by means of a lead 61 with the light circuit connecting wire 19, leading to the several lights numbered 4 in the different lamps. From this construction it will be understood that with the brake in its normal inoperative position and with the signal switch 59 closed, current is supplied from the battery to all of the reference lights numbered 4. This will mean that at all times while the signal system is active the pilot light 4 in front of the operator will be active and the operator will be thus advised that the signal system is in working order.

When the brake is depressed towards its operative position it will move the shiftable contact 55 out of engagement with the contact 60 and into engagement with the third contact 62. This third contact is connected by means of conductor 63 which in turn is connected by means of by-path lead 64 with the motor lead 44 and also leads to a fixed brush 65 engaging a commutator ring 66 carried by the shaft of the motor 26. The commutator ring is formed of insulating material for the major portion of its circumferential length. The remaining portion is formed of a conducting strip 67 connected electrically to the wiper 30 and so disposed that when the wiper 30 is in engagement with the contact numbered 4$^a$, current will be supplied thereto through the contact and thus cause all the No. 4 lights to flash with each rotation of the wiper.

From this construction it will be understood that depressing the brake will cause the lights No. 4 to flash periodically and continuously as long as the brake is in operative position.

It is suggested that the light No. 4 be utilized as a light for illuminating signs such as the license plate. Further the entire set of lights can be utilized when operating as a direction signal or as a backing signal to intensely illuminate the license plate and thus presenting a larger area by reflection from the sign than would be possible with the direct light from the lamps themselves. The operator of a following car thus has his attention forcibly attracted to the increased illumination of the rear license plate on the vehicle ahead. In case of the failure of the signal system it is herein suggested that there be employed a supplementary sign light 68 for illuminating the license plate. This sign light will be supplied by a lead 69 from the battery 27 and in turn controlled by a sign light switch 70. By this construction it will be possible when the switch 70 is on to use the light 68 as a parking light, or as a license illuminating light or as a tail light when the ignition switch 36 and when the signal switch 59 is off.

Having thus described my invention, I claim:—

1. In a vehicle, the combination with the service brake, the steering wheel and the change speed lever of the vehicle, of a signal device including a plurality of lights arranged in line to form a set, and means controlled by the turning movement of the steering wheel in one or the other direction for causing said light to flash in succession in the direction of turning, and controlled by the change speed lever for causing said lights to flash in succession simultaneously in both directions to indicate a backing movement of the vehicle and controlled by the brake for causing one of said lights to flash repeatedly to indicate that the vehicle is slowing down to a stop.

2. In a signal device, the combination of means forming a plurality of circuits, each including a light and two fixed contacts, said lights being arranged in line to form a signal, one of said two contacts of each circuit disposed in a circle of similar contacts and the other contact of each circuit disposed in another circle of such contacts, and a motor provided with two wiping contacts, one for each circle of contacts, said wiping contacts and said fixed contacts being organized in electrically reversed order so that one wiping contact will cause the lights to flash along said line from right to left and the other wiping contact will cause the lights to flash along said line from left to right, and control means for selectively supplying electric energy to either one or both of said wipers and for simultaneously energizing said motor.

3. In a signal device, the combination of means forming a plurality of circuits, each including a light and two fixed contacts, said lights being arranged in line to form a signal, one of said two contacts of each circuit disposed in a circle of similar contacts and the other contact of each circuit disposed in another circle of such contacts, a motor provided with two wiping contacts, one for each circle of contacts, said wiping contacts and said fixed contacts being organized in electrically reversed order so that one wiping contact will cause the lights to flash along said line from right to left and the other wiping contacts will cause the lights to flash along said line from left to right and control means for selectively supplying electric energy to either one or both of said wipers.

4. In a signal device, the combination of means forming a plurality of light circuits each including a light and two contacts, said lights being arranged in line, to form a signal, one of said two contacts of each light circuit arranged in a circle of similar contacts, the other contacts of each light circuit arranged in a concentric circle of similar contacts, the contacts of each circle being in the same relative order of position as their associated lights and with the contact of one end light diametrically disposed relative to the contact of the other end light and a pair of wiping contacts, one for each circle of contacts and control means for supplying electric energy selectively to said wiping contacts.

5. In a vehicle, the combination with the steering wheel and the change speed lever of the vehicle; of a signal device including a plurality of lights arranged in a straight line to form a set, constituting a direction signal which when flashing successively from end to end in one direction indicates an intent of the operator of the vehicle to drive in said direction and when flashing successively from end to end in the opposite direction indicates an intent to turn in said opposite direction and means controlled by the turning movement of the steering wheel in one direction for causing all of said lights in the set to flash one after the other in succession in one direction and controlled by the turning movement of the steering wheel in the opposite direction to cause all of said lights to flash, one after the other in succession in the opposite direction and to continue said successive flashings as long as the steering wheel is in either of its positions to cause the lights to flash and controlled by the change speed lever for causing all of said lights to flash in succession one after the other simultaneously in both directions and to continue said successive flashings as long as the lever is in position to cause the lights to flash.

6. In a vehicle signal system, the combination of a plurality of lights arranged in line to form a direction indicating signal, circuit and control means for causing the lights to intermittently flash successively from one end of the line to the other to indicate direction of turning, additional circuit and control means, including a single one only of the said lights whereby said single light only may be caused to flash intermittently upon depression of a control pedal of the vehicle, and still further circuit and control means whereby the said single light only may be caused to burn continuously when neither of the said other controls are in operation.

7. In a vehicle signal system, the combination of a plurality of lights arranged in line to form a direction indicating signal, contactor and circuit means for causing the lights to flash in one direction, other contactor and circuit means for causing the lights to flash in the opposite direction, a single motor always turning in the same direction operatively connected to both said contactor means, additional circuit means including a control operatively connected to the vehicle steering wheel for selecting between the said contactors and controlling the direction of successive flashing through the lights and causing all of said lights to flash in succession one after the other in the direction of turning, said successive flashings in either direction continuing throughout the time the steering wheel is turned from its normal forward driving position.

Signed at New York city, in the county of New York and State of New York, this 29th day of December, A. D. 1924.

HOWARD J. MURRAY.